US008267186B2

(12) United States Patent
Kindley et al.

(10) Patent No.: US 8,267,186 B2
(45) Date of Patent: Sep. 18, 2012

(54) FOLDING TOOL BAR METHOD AND APPARATUS FOR USE WITH AGRICULTURAL IMPLEMENTS

(75) Inventors: Michael Kindley, Oskaloosa, IA (US); Michael Vaske, Knoxville, IA (US); Rustin V. Bentzinger, Pella, IA (US)

(73) Assignee: Forage Innovations B.V., Pa Maassluis (NL)

( * ) Notice: Subject to any disclaimer, the term of this patent is extended or adjusted under 35 U.S.C. 154(b) by 8 days.

(21) Appl. No.: 12/482,567

(22) Filed: Jun. 11, 2009

(65) Prior Publication Data

US 2010/0314140 A1     Dec. 16, 2010

(51) Int. Cl.
*A01B 49/00* (2006.01)
(52) U.S. Cl. .................................................. 172/311
(58) Field of Classification Search ............ 172/311
See application file for complete search history.

(56) References Cited

U.S. PATENT DOCUMENTS

| | | | | |
|---|---|---|---|---|
| 2,828,597 | A | * | 4/1958 | Moore .......................... 172/626 |
| 3,778,987 | A | | 12/1973 | Rankins |
| 4,066,274 | A | * | 1/1978 | Adee ............................ 172/311 |
| 4,088,346 | A | * | 5/1978 | Schreiner et al. ............. 280/656 |
| 4,319,643 | A | * | 3/1982 | Carter et al. .................. 172/311 |
| 4,504,076 | A | * | 3/1985 | Bedney .......................... 172/311 |
| 4,582,143 | A | * | 4/1986 | Pratt ............................... 172/311 |
| D298,139 | S | | 10/1988 | Van Staveren |
| 4,947,631 | A | | 8/1990 | Kuehn |
| 5,062,260 | A | | 11/1991 | Tonutti |
| 5,488,996 | A | * | 2/1996 | Barry et al. ................... 172/311 |
| 5,493,853 | A | | 2/1996 | Tonutti |
| 5,540,040 | A | | 7/1996 | Peeters |
| 5,598,691 | A | | 2/1997 | Peeters |
| 5,685,135 | A | | 11/1997 | Menichett et al. |
| 5,752,375 | A | | 5/1998 | Tonutti |
| 5,787,988 | A | * | 8/1998 | Harlan et al. ................. 172/311 |
| 5,899,055 | A | | 5/1999 | Rowse |
| 5,918,452 | A | | 7/1999 | Kelderman |
| 6,038,844 | A | | 3/2000 | Peeters |

(Continued)

FOREIGN PATENT DOCUMENTS

AU          456215          12/1974

(Continued)

OTHER PUBLICATIONS 3-page International Search Report—mailed Feb. 23, 2011.

*Primary Examiner* — Thomas B Will
*Assistant Examiner* — Joel F. Mitchell
(74) *Attorney, Agent, or Firm* — Strum & Fix LLP

(57) ABSTRACT

A folding tool bar apparatus for an implement such as a rake, the toolbar having a frame with ground engaging wheels. The folding tool bar apparatus is adapted to be operatively attached to a prime mover for towing from place to place. First and second tool bars are pivotally attached to linkage members. A tongue member that sides along its longitudinal axis with respect to the frame pulls front ends of the tool bars toward the tongue member during movement to the transport position thereof and away from the tongue member during movement towards the working position thereof. The rear end of the tongue member is behind the frame in the working position thereof, making the folding tool bar apparatus shorter than conventional folding tool bars in the working position thereof.

10 Claims, 14 Drawing Sheets

U.S. PATENT DOCUMENTS

| | | |
|---|---|---|
| 6,314,710 B1 | 11/2001 | Tonutti |
| 6,502,645 B1 * | 1/2003 | Brueggen et al. ............. 172/311 |
| 6,865,873 B2 | 3/2005 | Menichett et al. |
| 6,945,024 B2 | 9/2005 | Tonutti |
| 7,165,386 B2 | 1/2007 | Tonutti |
| 7,313,905 B2 * | 1/2008 | Vaske et al. ..................... 56/379 |
| 7,584,595 B2 * | 9/2009 | Marggi et al. ................... 56/385 |
| 7,604,068 B1 * | 10/2009 | Friesen ........................ 172/311 |
| 2007/0033915 A1 | 2/2007 | Vaske |
| 2007/0163791 A1 * | 7/2007 | Meek ............................ 172/311 |

FOREIGN PATENT DOCUMENTS

| | | |
|---|---|---|
| AU | 1678076 | 3/1978 |
| DE | 3034870 | 4/1982 |
| WO | 88/01470 | 3/1988 |

* cited by examiner

FOLDING TOOL BAR METHOD AND APPARATUS FOR USE WITH AGRICULTURAL IMPLEMENTS

FIELD OF THE INVENTION

The present invention relates generally to agricultural equipment, and more specifically to a folding frame for an agriculture implement such as a twin wheel rake.

BACKGROUND

The process of baling agricultural crops starts when the crop is cut or mowed and laid onto the ground in an arrangement to aid drying. After reaching an initial dried condition, the process typically includes a raking step where the crop is formed into a windrow to enhance the final drying process. Since the capacity of balers is affected by the form and size of the final windrow, the raking process is also used to arrange the crop into a windrow that is optimized for baling.

The raking process often involves collecting the crop material over a wide swath to increase the density of the crop in the final windrow of an adjustable width. It is common to use twin rakes, including left and right side rakes that move material toward the center, thereby efficiently forming the desirable final windrow.

The frame that carries the side rakes of a wide twin rake must provide adequate flotation to allow the raking elements to follow variations in the terrain and to move between a folded transport configuration and an extended operating configuration. It is also desirable, but not indispensable, to provide varying windrow widths.

Most folding rakes on the market today that fold by changing the tongue length, do so by using folding arms or telescoping frame members. This causes the working or operational length to be longer, making it more difficult for the operator to turn the tractor and rake at the end of each windrow.

Therefore, there is a need for an improvement to a folding tool bar for agricultural machines, such as rakes, to overcome the aforementioned deficiencies.

SUMMARY

The present invention relates to a folding tool bar apparatus for an implement such as a rake, the toolbar having a frame with ground engaging wheels. The folding tool bar apparatus is adapted to be operatively attached to a prime mover for towing from place to place. First and second tool bars, attached to and moved by a tongue member, are pivotally attached to linkage members and pivotal joints permit the folding tool bar apparatus to be moved between a narrow and longer transport position and a shorter and wider working position, while at the same time retaining flexibility in use. The rear end of the tongue member is behind the frame in the working position thereof, making the folding tool bar apparatus shorter than conventional folding tool bars in the working position thereof.

DETAILED DESCRIPTION OF THE PREFERRED EMBODIMENTS

Figure 1:
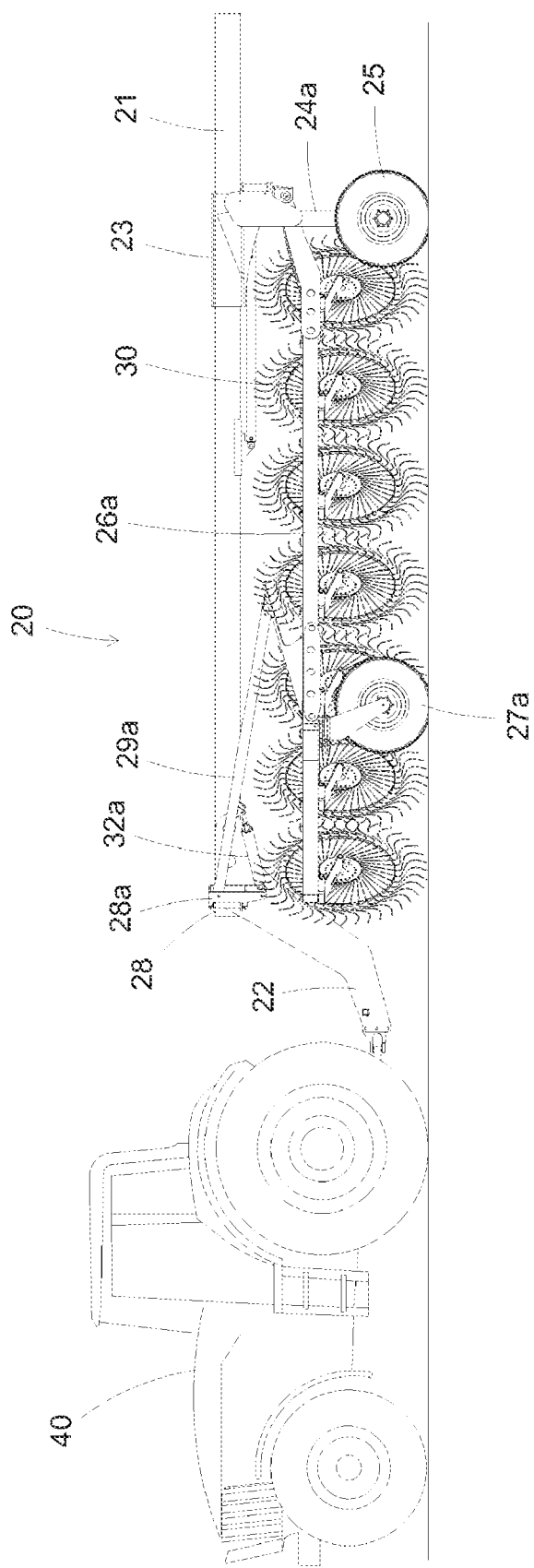
FIG. 1 is a side elevational view of a tractor pulling a folding toolbar having a wheeled rakes attached thereto.
Figure 3:
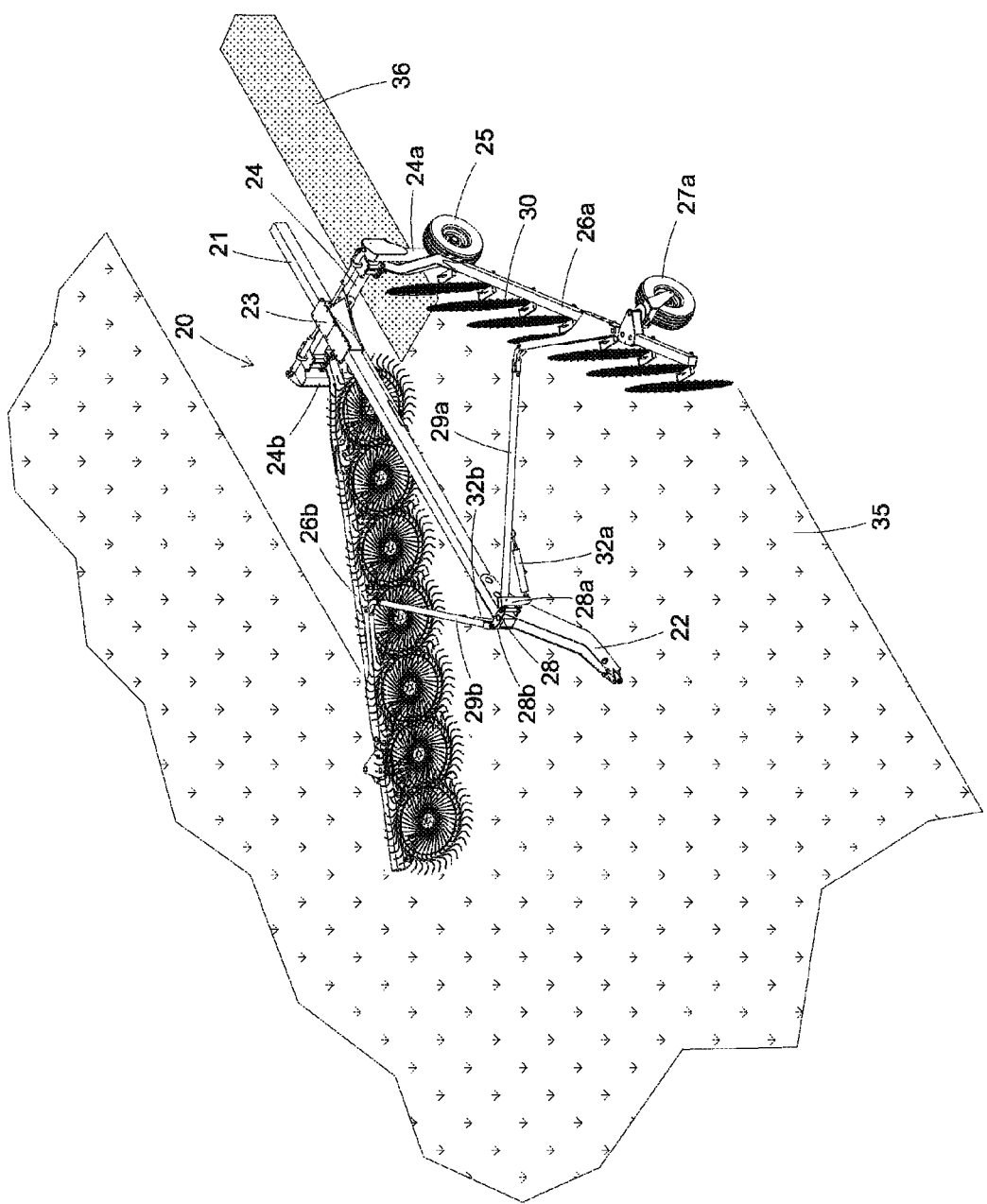
FIG. 3 is a perspective view of the present invention shown in use in a field raking hay into a windrow.

Referring now to the drawings wherein like reference numerals designate identical or corresponding parts throughout the several views, FIG. 1 shows the present invention toolbar (20) having a plurality of wheel rakes (30) attached thereto and being towed by a tractor (40) in the operational position shown in FIG. 3.

Figure 4:
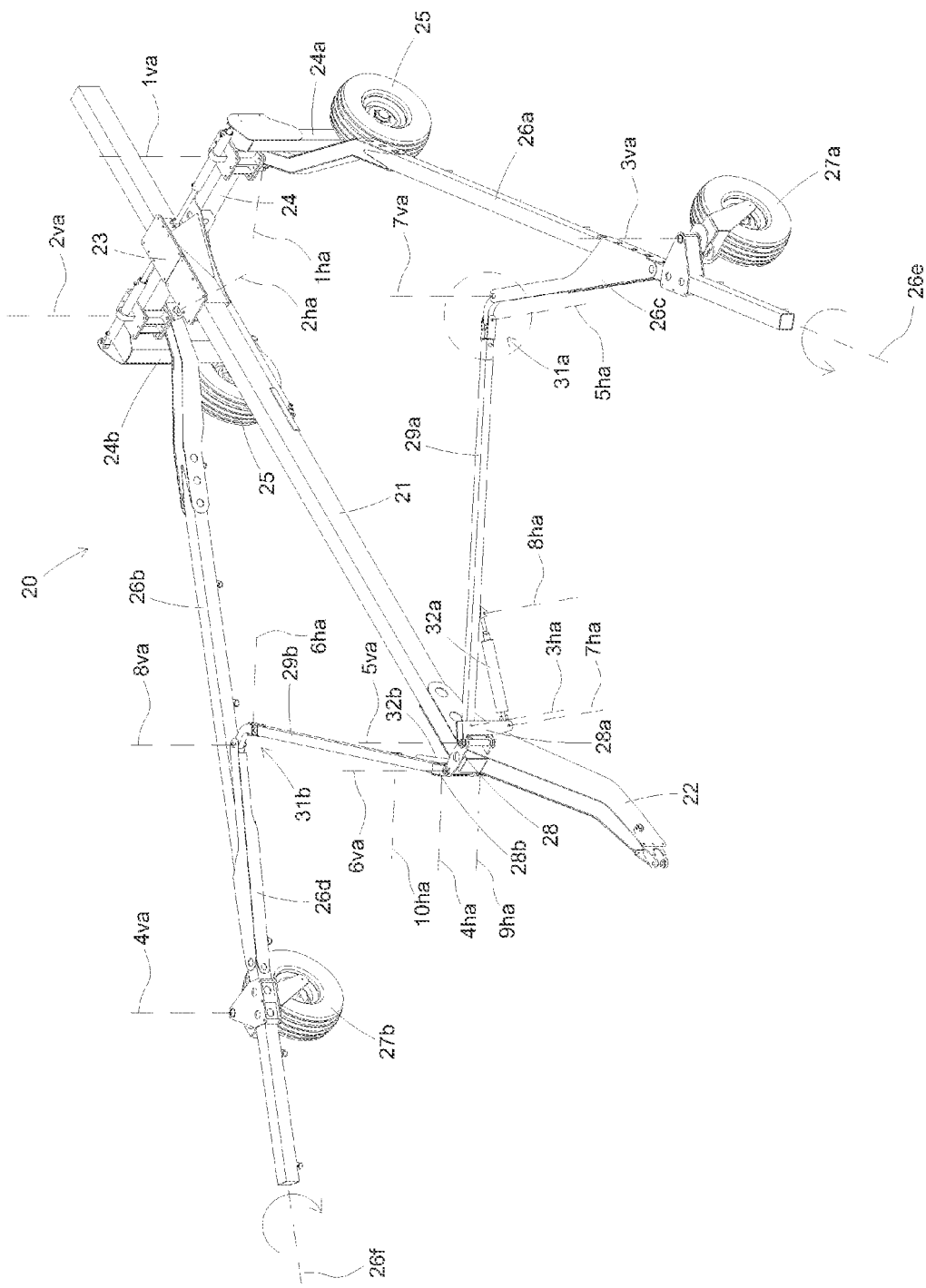
FIG. 4 is a perspective view of the folding toolbar of the present invention in the operational position thereof.

FIG. 4 shows an elongated tongue member (21) being attached at the front end thereof to a hitch structure (22) and at the rear thereof it extends through a slide box (23) which is rigidly attached to a frame (24). The frame (24) has downwardly depending members (24a) thereon for rotatably mounting ground-engaging transport wheels (25). A first toolbar (26a) is pivotally attached to the frame (24) along vertical axis (1va) and along horizontal axis (1ha). On the other side of the folding toolbar a second toolbar (26b) is attached to the frame (24) by the structure (24b) so that the second toolbar (26b) will pivot along the axis (2va) and along the horizontal axis (2ha). A first caster wheel structure (27a) is mounted to pivot along vertical axis (3va) and a second caster wheel structure (27b) is attached to the second toolbar (26b) along vertical axis (4va).

A bracket (28), including sub-brackets (28a and 28b), is attached to the elongated tongue member (21) between the hitch structure (22) and the rest of the elongated tongue (21). A first arm (29a) is pivotally attached to the bracket (28) along a substantially horizontal axis (3ha) and along a substantially vertical axis (5va). Similarly, an arm (29b) is mounted along a horizontal axis (4ha) and a vertical axis (6va).

A knuckle (31a) attaches the first arm (29a) to the first toolbar (26a) through an intermediary member (26c) along a substantially horizontal axis (5ha) and along a substantially vertical axis (7va). Similarly, the arm (29b) is attached by a knuckle (31b) so that the arm (29b) is pivotally attached along a horizontal axis (6ha) and along a vertical axis (8va) through an intermediary member (26d) bolted to the toolbar (26b).

When the rake wheels (30) shown in FIG. 1 are attached to the toolbars (26a) and (26b) they will tend to torque the first toolbar (26a) along a longitudinal axis (26e). To counteract this torquing of the toolbar (26a), a stabilizer (32a) is pivotally attached along a first horizontal axis (7ha) and a second horizontal axis (8ha). This stabilizer (32a) merely has a strong spring inside in order to ultimately push on the arm (29a) to provide a clockwise torque on toolbar (26a) in the position shown in FIG. 4. Similarly, there is another stabilizer (32b), the stabilizer (32b) being pivotally mounted along a first horizontal axis (9ha) and to the bracket (28), including sub-brackets (28a and 28b), and along horizontal axis (10ha) to the arm (29b) for the same purpose of counteracting the torque along line (26f).

Figure 2:
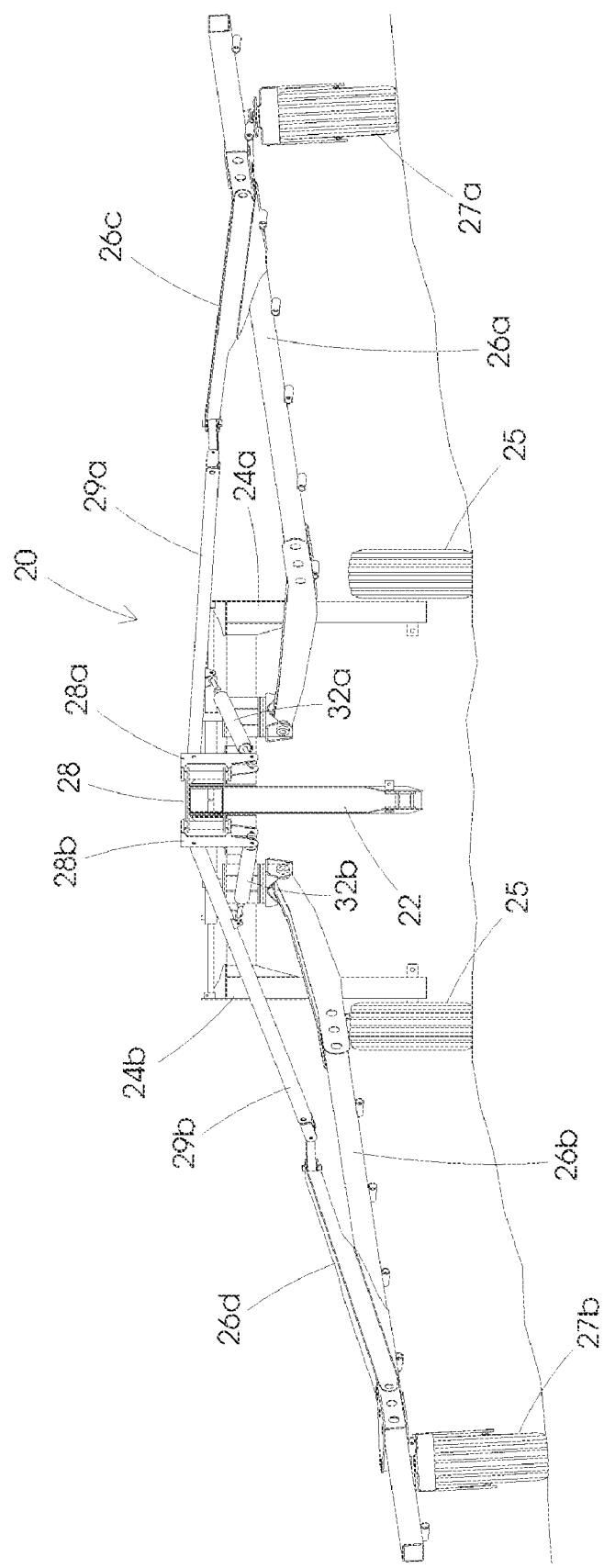
FIG. 2 is a front view of the folding toolbar on uneven terrain.
Figure 9:
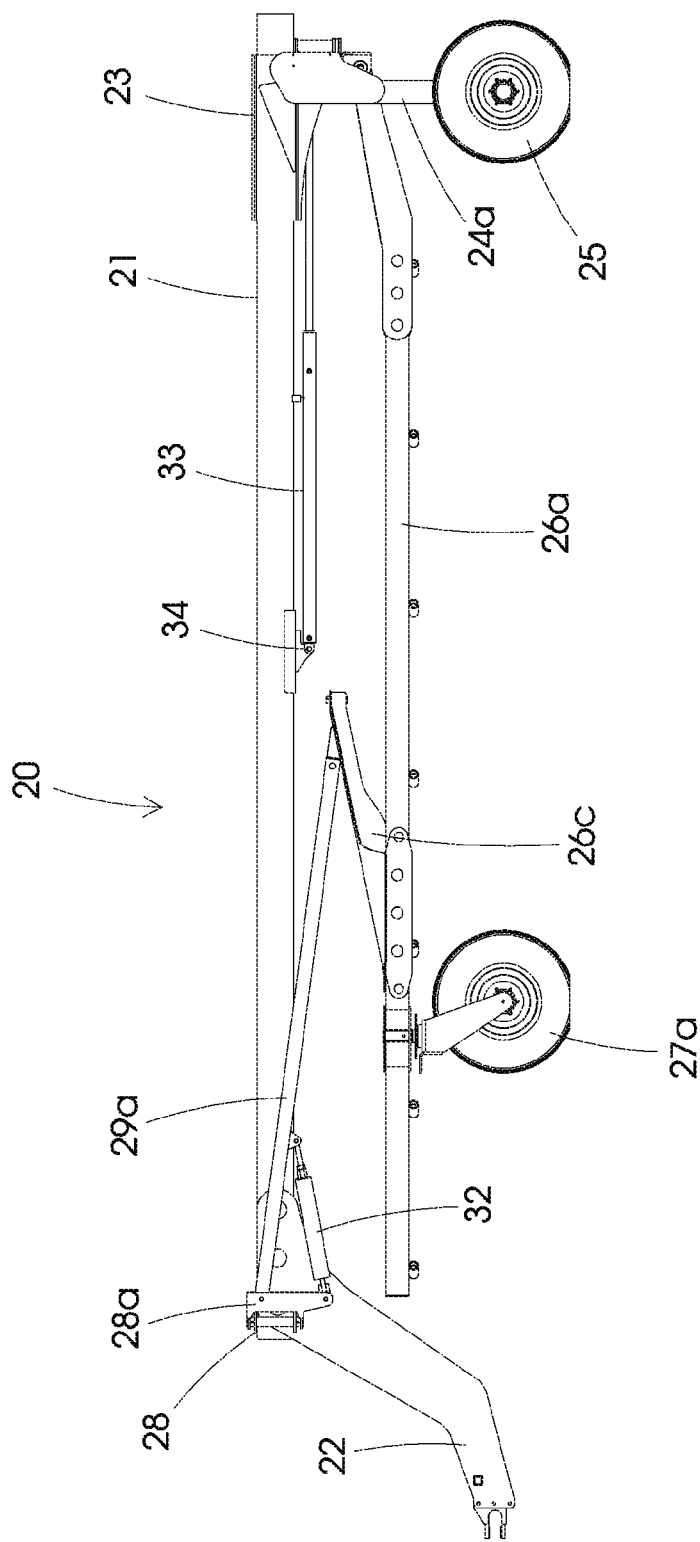
FIG. 9 is a side view of the folding toolbar of the present invention when the toolbar is in the transport position thereof.
Figure 10:
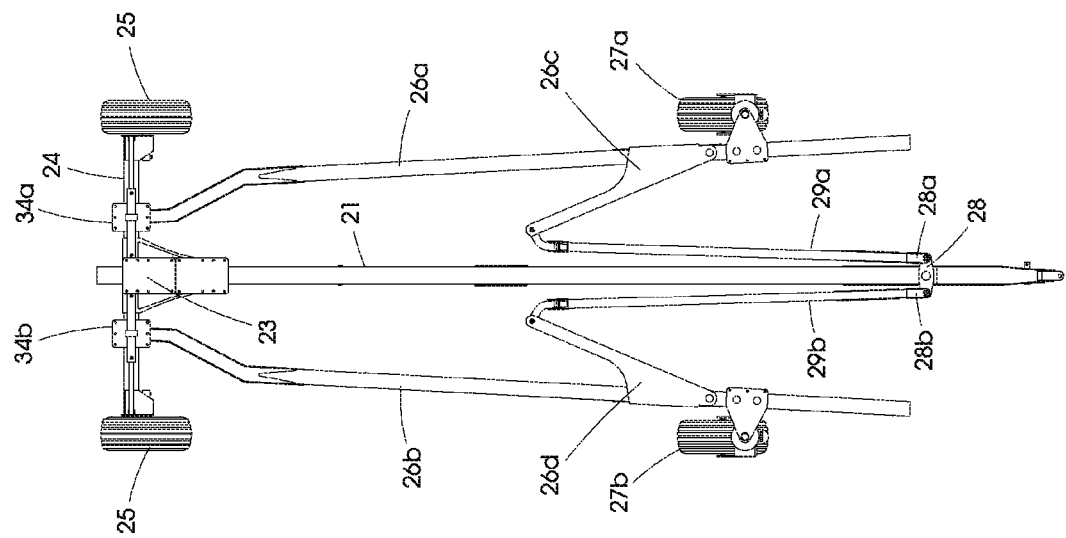
FIG. 10 is a top view of the present invention in the transport position shown in FIG. 9.
Figure 11:
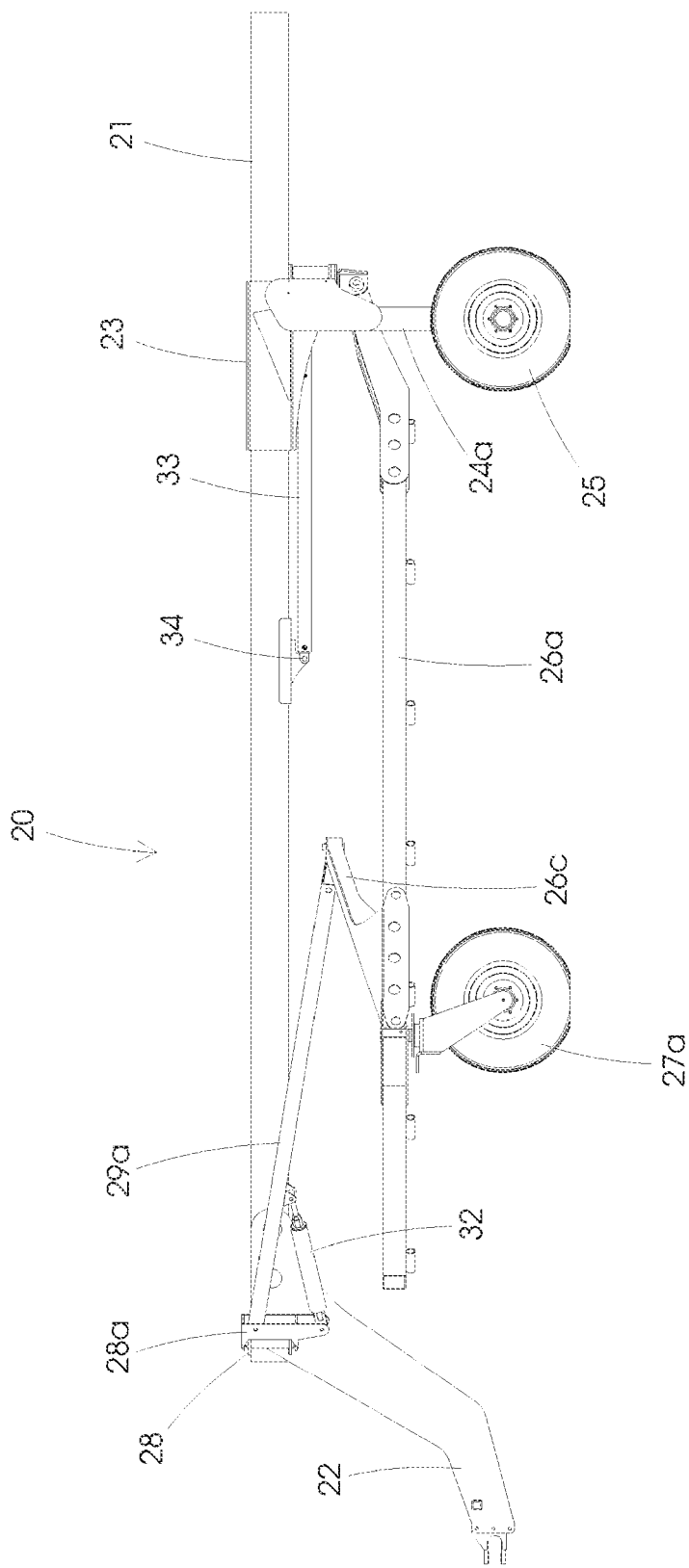
FIG. 11 is a side view of the folding toolbar in the operational position thereof as shown for example in FIG. 7.
Figure 12:
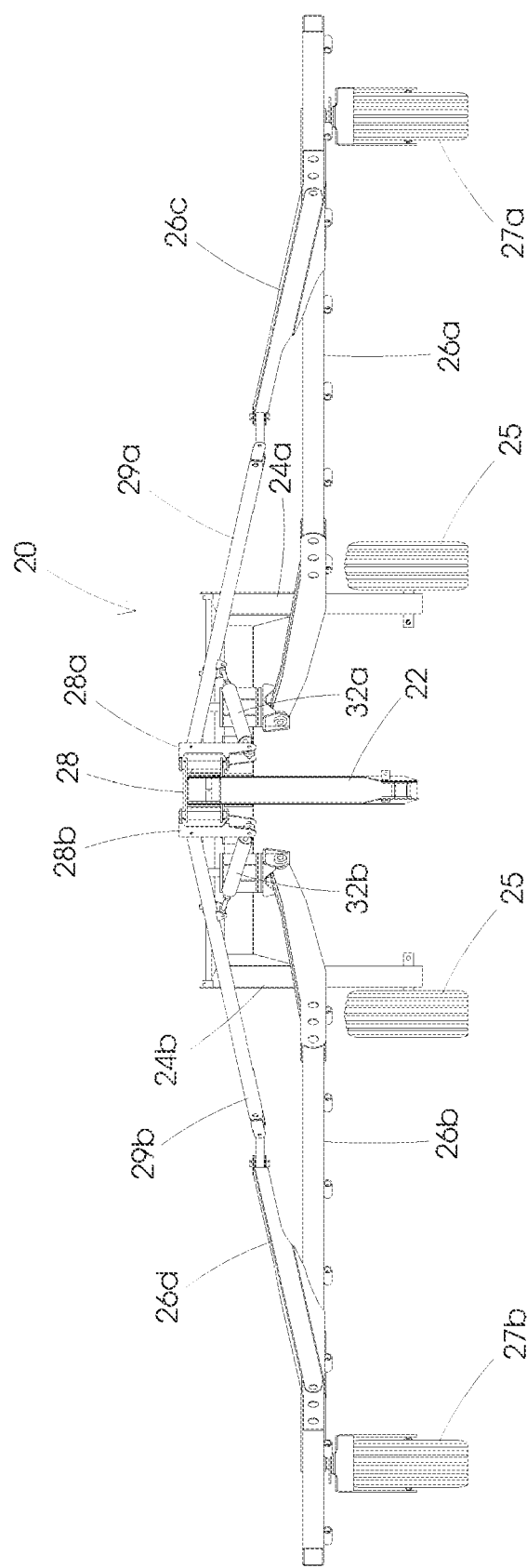
FIG. 12 is a front view of the folding toolbar of the present invention in the operational position thereof.

Referring now to FIG. 2, it can be seen that all of the axes used and explained in detail in FIG. 4 permit the toolbar to follow any contour of the land, for example as shown in FIG. 2 where the wheels (25, 27a and 27b) are all at different heights with respect to the frame (24). A hydraulic cylinder (33), shown best in FIG. 9, is attached along the horizontal axis at (34) to the elongated tongue (21) and is attached at the other end to the frame (24) that carries the transport wheels (25). It is the lengthening or shortening of the hydraulic cylinder (33) that moves the tongue (21) between the transport position shown for example in FIGS. 13 and 14 in solid lines and the working position shown in dashed lines in FIG. 14, which is also shown in FIGS. 1 and 3 for example.

Figure 5:
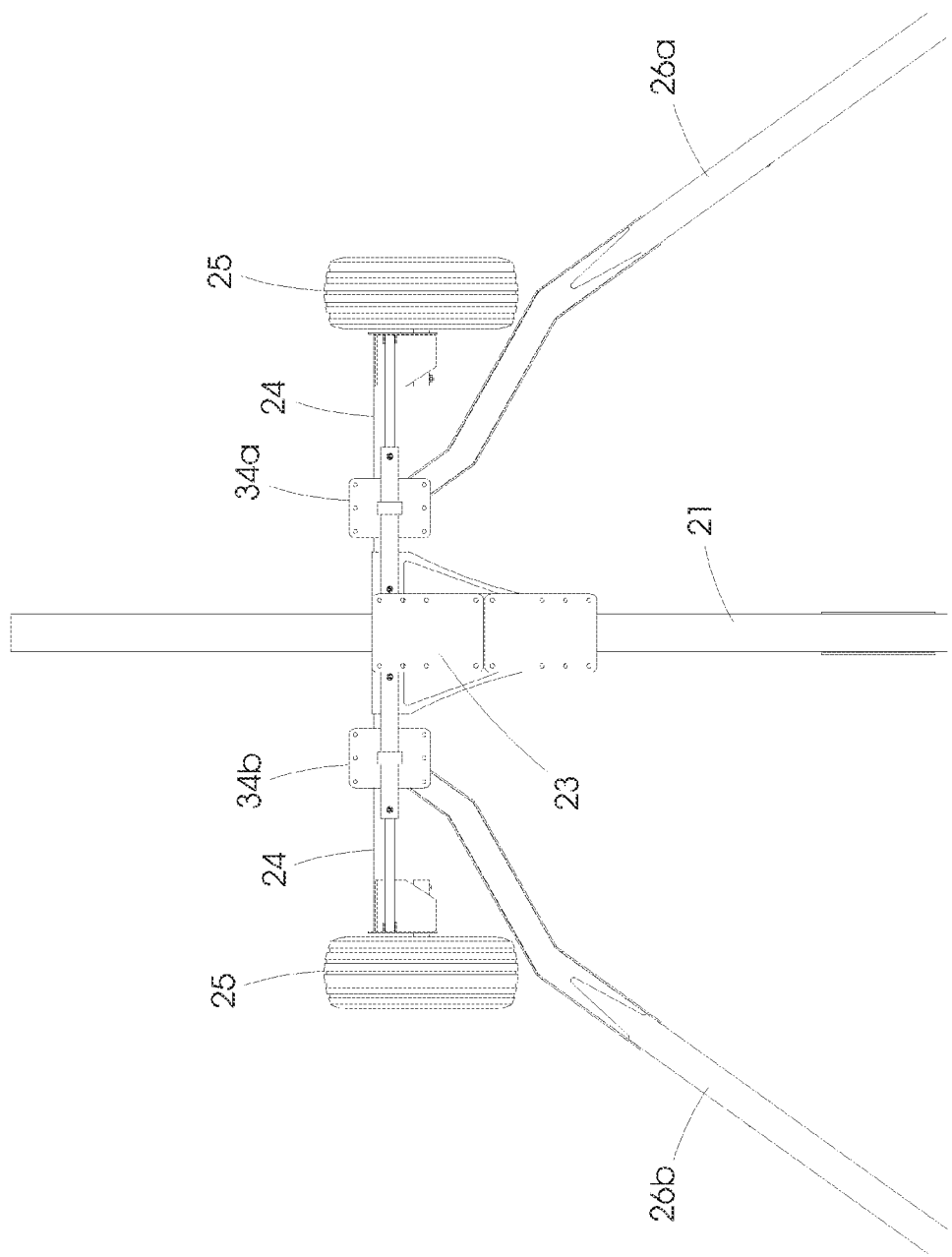
FIG. 5 is a top view of the rear end of the present invention in an operational position with a minimum windrow width setting.
Figure 6:
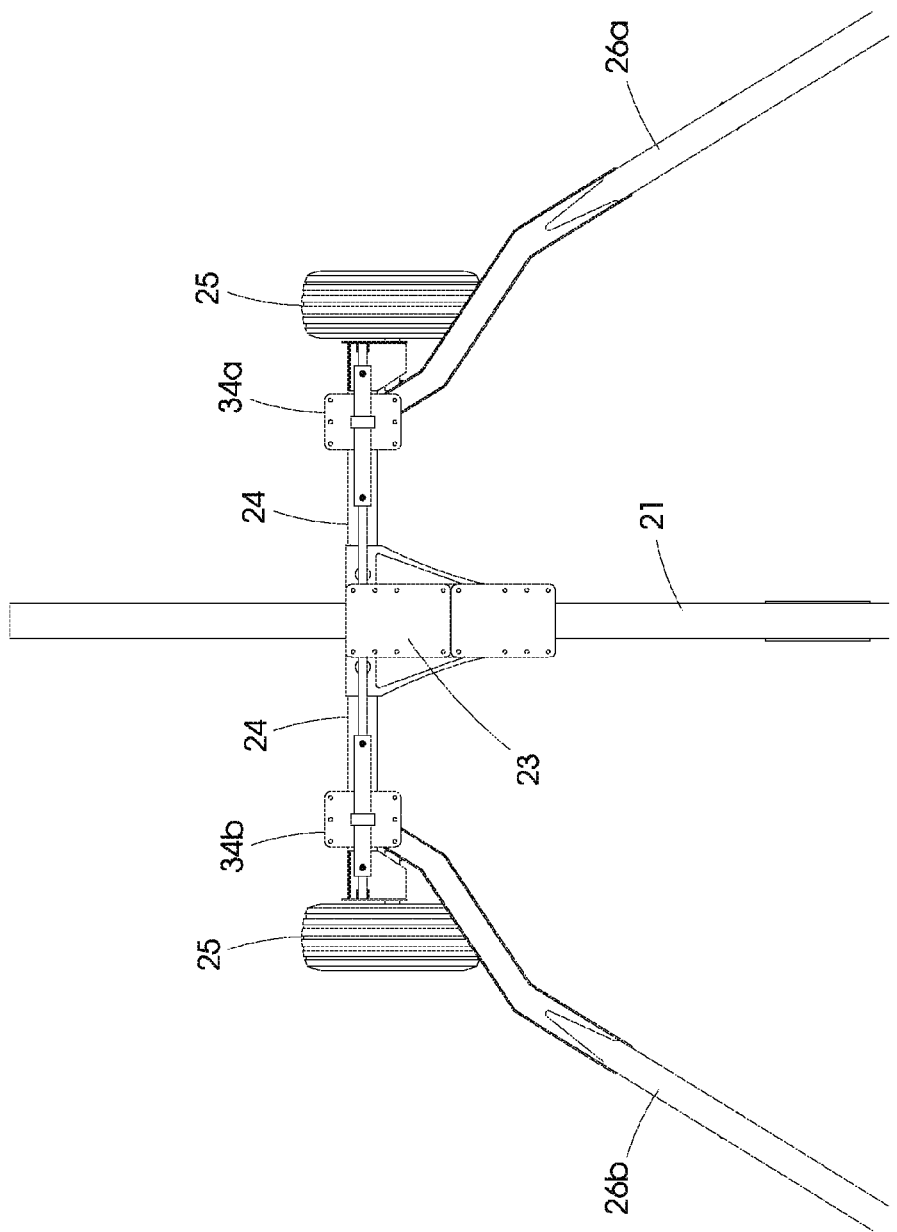
FIG. 6 is a top view like FIG. 5 but showing the windrow width being positioned outwardly to a maximum windrow width when the present apparatus is used with a rake.
Figure 7:
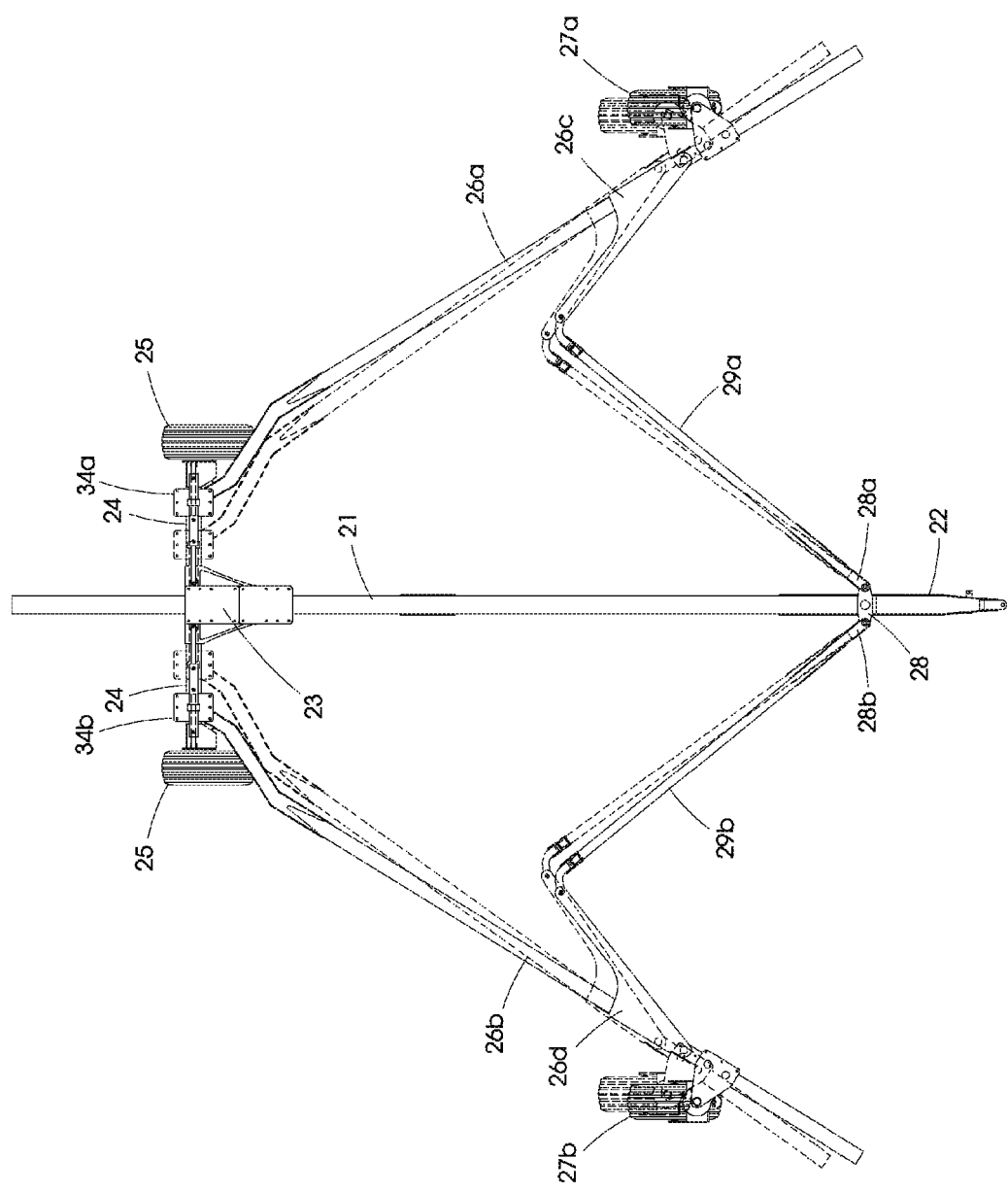
FIG. 7 is a top view of the present invention showing the folding toolbar in solid lines in an operational position and in dashed lines when the windrow width has been shortened.
Figure 8:
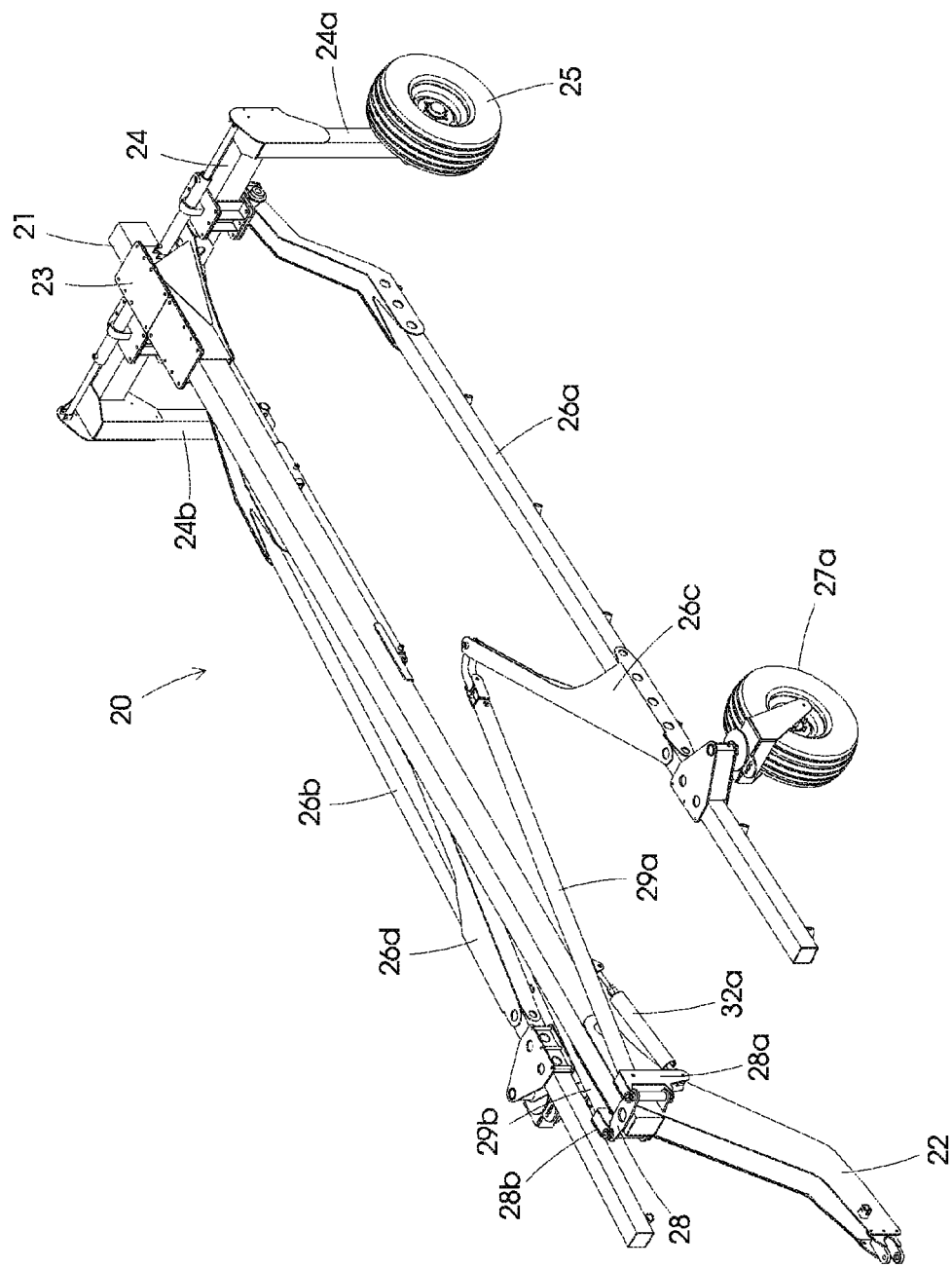
FIG. 8 is a perspective view of the present invention in the transport or folded position thereof.

Referring to FIGS. 5, 6 and 7, it is noted that brackets (34a) and (34b) are bolted to the frame (24) but can be adjusted closer or farther from the respective ends of the frame (24) to adjust the width of the windrow in the case of a rake. If tools other than rakes are attached to the toolbars (26a and 26b), other adjustments can be made. The changing of the windrow width as shown FIGS. 5, 6 and 7 is not so important in and of itself, but this kind of adjustment is not possible with most other types of rakes, for example, the rake shown in U.S. Pat. No. 6,945,024 to Tonutti, wherein if you wanted to change where the pivot is between toolbars (30) and frame (24), it would adversely affect the other folding parts of the toolbar. Consequently, the folding toolbar of the present invention is much more versatile than many other toolbars that are on the market or in the prior art.

Figure 13:
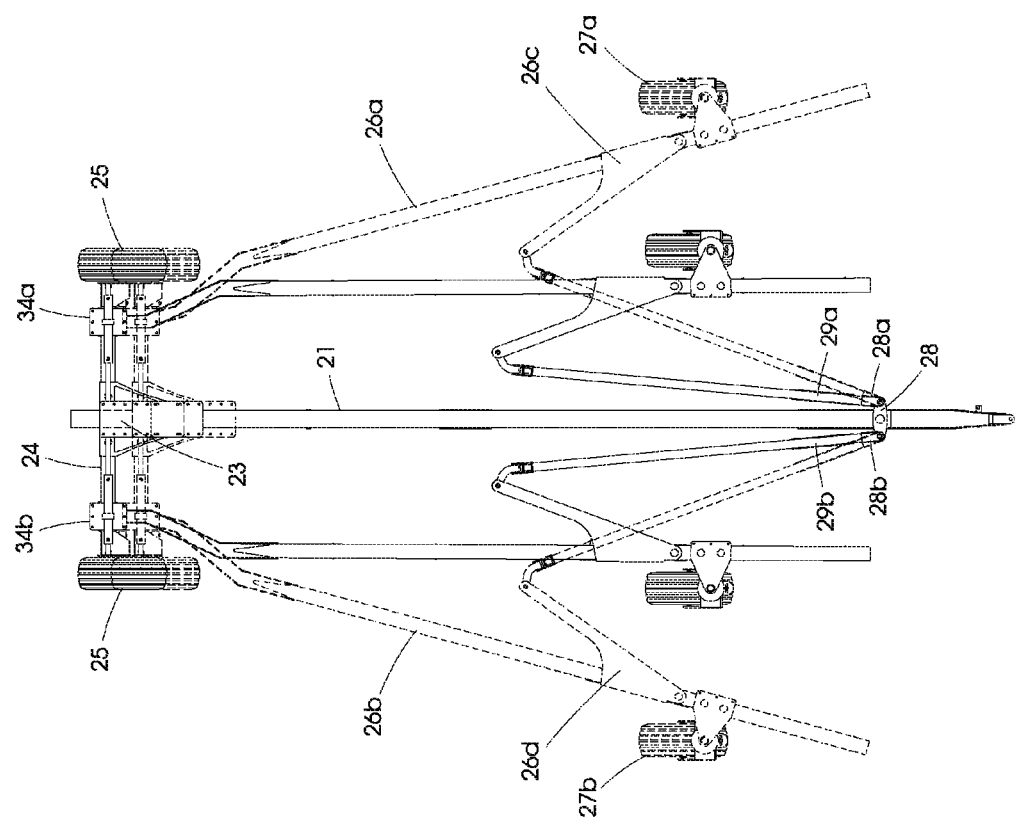
FIG. 13 is a top view of the present invention shown in solid lines in the transport position thereof and in dashed lines shown halfway open to the operational position thereof.
Figure 14:
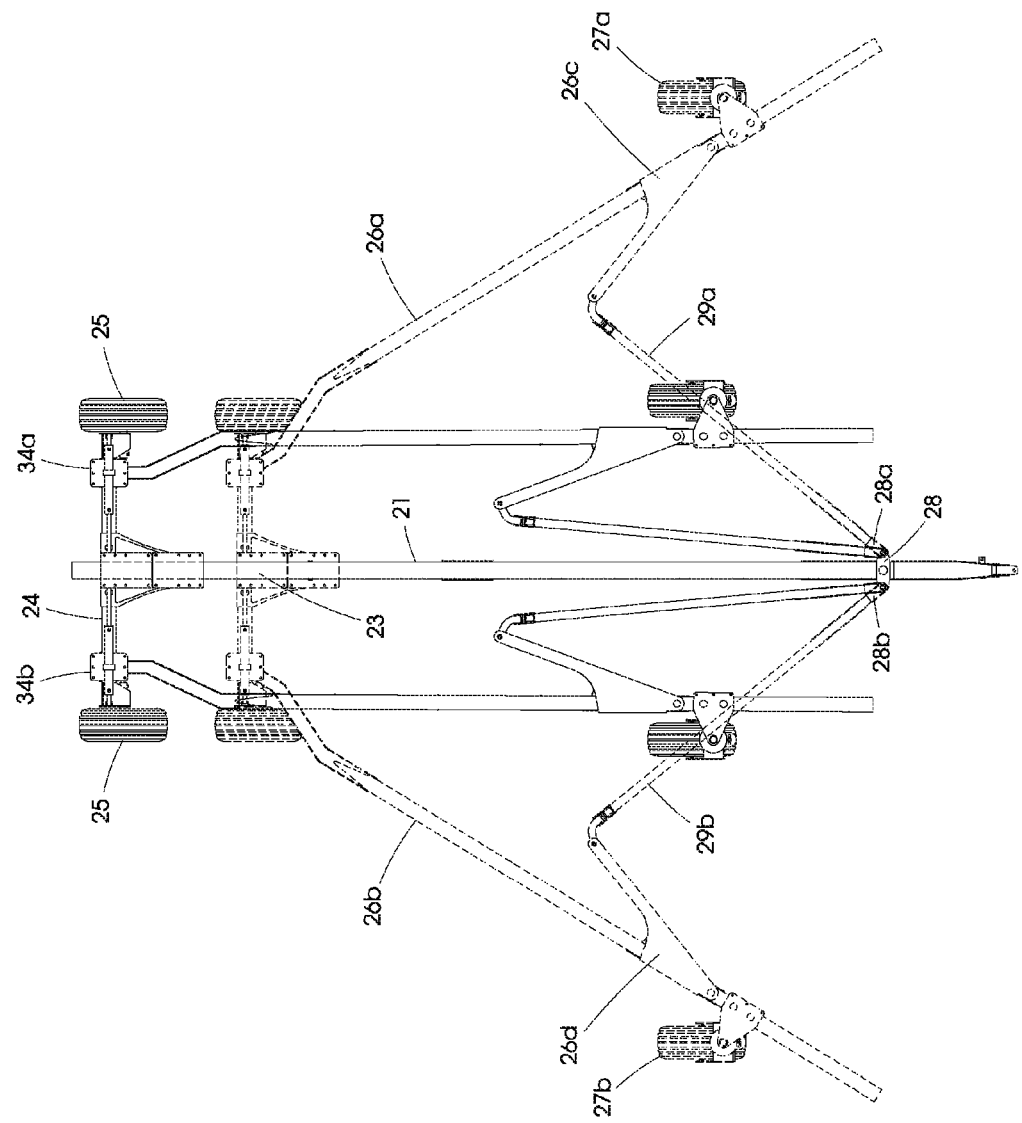
FIG. 14 is a top view similar to FIG. 13 but showing the folding toolbar of the present invention in solid lines in the transport position and in dashed lines in the operational position, the same position as when it is used to rake the field as shown in FIG. 3.

In operation, the folding dual toolbar apparatus (20) shown in FIG. 1 being used with rake wheels (30) could be in the solid line position shown in FIG. 13 to travel through gates and down a road or highway and still be narrow enough to not extend into the lane of traffic going the other direction. Once the folding dual toolbar apparatus (20), rake (30) is pulled into a field by tractor (40) shown in FIG. 1, the hydraulic cylinder (33) is shortened causing frame (24) to move with respect to the elongated tongue (21) to the position shown in FIGS. 3 and 4, which is the working position of the toolbar of FIG. 4 and rake (30) of FIG. 3. In FIG. 3, the portion in front of the folding dual toolbar apparatus (20) and rake (30) with the numeral (35) thereon represents a crop such as hay which has been cut and the portion (36) represents the windrow that is formed once the rake is moved forwardly over the cut crop (35). Of course when the task of windrowing the entire field has been completed and it is desired to go back through a gate and onto a public road or highway, the hydraulic cylinder (33) is lengthened to the position shown in FIG. 9, for example, which then moves the folding dual toolbar apparatus (20) to the solid line position shown in FIGS. 13 and 14, which is the transport position.

Obviously many modifications and variations of the present invention are possible in light of the above teachings. It is therefore to be understood that, within the scope of the appended claims, the invention may be practiced otherwise than as specifically described.

The invention claimed is:
1. Apparatus comprising:
(a) an elongated tongue member having a front end and a rear end and being adapted at the front end thereof to be operatively attached to a towing prime mover;
(b) a frame operatively slideably attached to the rear of the tongue member between a transport position closer to the rear end of the tongue member and a working position forward of the transport position thereof;
(c) ground engaging wheels operatively attached to the frame for permitting the frame to be moved at least in a forward direction, at least one of the ground engaging wheels being rotatable about an axis which is fixed with respect to the frame;
(d) a first tool bar operatively pivotally attached to the frame along a first substantially vertical axis and along a first substantially horizontal axis, the first substantially vertical axis being fixed with respect to the first tool bar, the first substantially vertical axis being a greater distance forward of the rear end of the tongue member when the frame is in the working position than when the frame is in the transport position thereof;
(e) a second tool bar operatively pivotally attached to the frame along a second substantially vertical axis and along a second substantially horizontal axis, which second substantially horizontal axis can be the same as the first substantially horizontal axis, the second substantially vertical axis being fixed with respect to the second tool bar, the second substantially vertical axis being a greater distance forward of the rear end of the of the tongue member when the frame is in the working position than when the frame is in the transport position thereof;
(f) a first ground engaging caster wheel operatively pivotally attached to the first tool bar along a third substantially vertical axis;
(g) a second ground engaging caster wheel operatively pivotally attached to the second tool bar along a fourth substantially vertical axis;
(h) a bracket operatively attached to the tongue member;
(i) a first arm operatively pivotally attached at one end thereof to the bracket along a fifth substantially vertical axis, the first arm also being operatively pivotally attached at the one end thereof along a third substantially horizontal axis;
(j) a second arm operatively pivotally attached at one end thereof to the bracket along a sixth substantially vertical axis, the second arm also being operatively pivotally attached at the one end thereof along a fourth substantially horizontal axis, which fourth substantially horizontal axis can be coincident with the third substantially horizontal axis;
(k) a first knuckle joint operatively pivotally attaching another end of the first arm to the first tool bar along a seventh substantially vertical axis and along a fifth substantially horizontal axis;
(l) a second knuckle joint operatively pivotally attaching another end of the second arm to the second tool bar along an eighth substantially vertical axis and along a sixth substantially horizontal axis; and

(m) the tongue member having a front end and a rear end, the rear end of the tongue member being behind the frame in the working position thereof.

2. The apparatus of claim 1 further comprising:
(a) a first stabilizer operatively pivotally attached to the bracket along a seventh substantially horizontal axis at one end thereof and operatively pivotally attached to the first arm along an eighth substantially horizontal axis; and
(b) a second stabilizer operatively pivotally attached to the bracket along a ninth substantially horizontal axis at one end thereof, which ninth substantially horizontal axis can be coincident with the seventh substantially horizontal axis, the second stabilizer also being operatively pivotally attached to the second arm along a tenth substantially horizontal axis.

3. The apparatus of claim 1 further comprising:
(a) a first width adjusting bracket operatively attached to the frame and to the first tool bar for selectively adjusting the first substantially vertical axis toward or away from the tongue; and
(b) a second width adjusting bracket operatively attached to the frame and to the second tool bar for selectively adjusting the second substantially vertical axis toward or away from the tongue.

4. The apparatus of claim 1 further comprising:
(a) a first raking device operatively attached to the first tool bar; and
(b) a second raking device operatively attached to the second tool bar.

5. Apparatus comprising:
(a) an elongated tongue member having a front end and a rear end and being adapted at the front end thereof to be operatively attached to a towing prime mover;
(b) a frame operatively slideably attached to the rear of the tongue member between a transport position closer to the rear end of the tongue member and a working position forward of the transport position thereof;
(c) ground engaging wheels operatively attached to the frame for permitting the frame to be moved at least in a forward direction, at least one of the ground engaging wheels being rotatable about an axis which is fixed with respect to the frame;
(d) a first tool bar operatively pivotally attached to the frame along a first substantially vertical axis and along a first substantially horizontal axis, the first substantially vertical axis being fixed with respect to the first tool bar, the first substantially vertical axis being a greater distance forward of the rear end of the tongue member when the frame is in the working position than when the frame is in the transport position thereof, the first tool bar having one end thereof that is close to the elongated tongue member in the transport position and farther from the tongue member in the working position than in the transport position thereof;
(e) a second tool bar operatively pivotally attached to the frame along a second substantially vertical axis and along a second substantially horizontal axis, the second substantially vertical axis being fixed with respect to the second tool bar, which second substantially horizontal axis can be the same as the first substantially horizontal axis, the second substantially vertical axis being a greater distance forward of the rear end of the of the tongue member when the frame is in the working position than when the frame is in the transport position thereof, the second tool bar having one end thereof that is close to the elongated tongue member in the transport position and farther from the tongue member in the working position than in the transport position thereof; and
(f) the tongue member having a front end and a rear end, the rear end of the tongue member being behind the frame in the working position thereof.

6. The apparatus of claim 5 further comprising:
(a) a first width adjusting bracket operatively attached to the frame and to the first tool bar for selectively adjusting the first substantially vertical axis toward or away from the tongue; and
(b) a second width adjusting bracket operatively attached to the frame and to the second tool bar for selectively adjusting the second substantially vertical axis toward or away from the tongue.

7. The apparatus of claim 5 further comprising:
(a) a first raking device operatively attached to the first tool bar; and
(b) a second raking device operatively attached to the second tool bar.

8. A method of using a folding dual toolbar apparatus of a type having a frame with a longitudinal axis and having transport wheels operatively attached to the frame, at least one of the ground engaging wheels being rotatable about an axis which is fixed with respect to the frame, a tongue member, the frame being operatively slideably attached to the tongue member, the tongue member having an longitudinal axis disposed transversely with respect to the longitudinal axis of the frame, the tongue member being adapted to be attached at the front thereof to a prime mover so that the folding dual toolbar apparatus can be towed forwardly from place to place, the tongue member having a front end and a rear end, first and second tool bars pivotally attached at a rear end thereof to the frame about respective substantially vertical axes, the first and second tool bars also having respective front ends, and linkage members operatively attached respectively between the first and second tool bars and the tongue member, the method comprising:
(a) moving the frame rearwardly with respect to the tongue member in a direction along the longitudinal axis of the tongue member and using the movement of the frame with respect to the tongue member to simultaneously pull forwardly the front ends of the first and second tool bars towards the tongue member to thereby cause the folding dual toolbar apparatus to be in a transport position; and
(b) moving the frame forwardly with respect to the tongue member along the longitudinal axis of the tongue member so that the rear end of the tongue member is disposed behind the frame while simultaneously using the movement of the tongue member, through the linkage members, to push the forward ends of the first and second tool bars away from the tongue member to thereby cause the folding dual toolbar apparatus to be in a working position thereof.

9. The method of claim 8 further comprising:
(a) using a first width adjusting bracket operatively attached to the frame and to the first tool bar for selectively adjusting the first substantially vertical axis toward or away from the tongue; and
(b) using a second width adjusting bracket operatively attached to the frame and to the second tool bar for selectively adjusting the second substantially vertical axis toward or away from the tongue.

10. The method of claim 8 further comprising:
(a) attaching a first raking device to the first tool bar; and
(b) attaching a second raking device to the second tool bar.

* * * * *